United States Patent
Liu et al.

(10) Patent No.: US 8,244,737 B2
(45) Date of Patent: Aug. 14, 2012

(54) RANKING DOCUMENTS BASED ON A SERIES OF DOCUMENT GRAPHS

(75) Inventors: Tie-Yan Liu, Beijing (CN); Hang Li, Beijing (CN); Bin Gao, Beijing (CN); Lei Yang, Beijing (CN); Lei Qi, Qingdao (CN)

(73) Assignee: Microsoft Corporation, Redmond, WA (US)

( * ) Notice: Subject to any disclaimer, the term of this patent is extended or adjusted under 35 U.S.C. 154(b) by 304 days.

(21) Appl. No.: 11/764,554

(22) Filed: Jun. 18, 2007

(65) Prior Publication Data

US 2008/0313168 A1 Dec. 18, 2008

(51) Int. Cl.
G06F 17/30 (2006.01)

(52) U.S. Cl. ........ 707/748; 707/726; 707/749; 707/751; 707/754

(58) Field of Classification Search .................. 707/1, 3, 707/5, 7, 100, 104.1, 665, 723, 725, 726, 707/748, 751, 802, 749, 754
See application file for complete search history.

(56) References Cited

U.S. PATENT DOCUMENTS

| | | | |
|---|---|---|---|
| 6,112,203 A | 8/2000 | Bharat et al. | |
| 7,076,483 B2 * | 7/2006 | Preda et al. | 707/5 |
| 7,089,252 B2 * | 8/2006 | Tomlin et al. | 707/101 |
| 7,251,654 B2 * | 7/2007 | Eiron et al. | 707/723 |
| 7,346,839 B2 * | 3/2008 | Acharya et al. | 707/3 |
| 7,356,530 B2 * | 4/2008 | Kim et al. | 707/7 |
| 7,398,271 B1 * | 7/2008 | Borkovsky et al. | 707/7 |
| 7,467,349 B1 * | 12/2008 | Bryar et al. | 715/205 |
| 7,509,344 B1 * | 3/2009 | Kamvar et al. | 707/104.1 |
| 7,533,092 B2 * | 5/2009 | Berkhin et al. | 707/5 |
| 7,593,935 B2 * | 9/2009 | Sullivan | 707/5 |
| 7,624,104 B2 * | 11/2009 | Berkhin et al. | 707/999.005 |
| 7,716,225 B1 * | 5/2010 | Dean et al. | 707/748 |
| 7,739,275 B2 * | 6/2010 | Dubinko et al. | 707/723 |
| 7,797,344 B2 * | 9/2010 | Kaul et al. | 707/791 |
| 7,818,399 B1 * | 10/2010 | Ross et al. | 709/218 |
| 7,840,572 B2 * | 11/2010 | Cutts et al. | 707/751 |
| 2004/0128273 A1 | 7/2004 | Amitay et al. | |
| 2005/0071328 A1 | 3/2005 | Lawrence | |
| 2005/0076003 A1 | 4/2005 | DuBose et al. | |
| 2005/0149502 A1 | 7/2005 | McSherry | |
| 2005/0216434 A1 | 9/2005 | Haveliwala et al. | |
| 2005/0234877 A1 | 10/2005 | Yu | |
| 2006/0036598 A1 * | 2/2006 | Wu | 707/5 |
| 2006/0041550 A1 | 2/2006 | Bennett et al. | |
| 2006/0074883 A1 | 4/2006 | Teevan et al. | |
| 2006/0224615 A1 | 10/2006 | Korn et al. | |

(Continued)

OTHER PUBLICATIONS

Becchetti, et al. "Link-based characterization and detection of web spam", AIRWEB '06, Aug. 10, 2006, Seattle, Washington, USA.

(Continued)

*Primary Examiner* — Dangelino Gortayo
(74) *Attorney, Agent, or Firm* — Perkins Coie LLP

(57) ABSTRACT

Ranking documents based on a series of web graphs collected over time is provided. A ranking system provides multiple transition probability distributions representing different snapshots or times. Each transition probability distribution represents a probability of transitioning from one document to another document within a collection of documents using a link of the document. The ranking system determines a stationary probability distribution for each snapshot based on the transition probability distributions for that snapshot and the stationary probability distribution of the previous snapshot. The stationary probability distributions represent a ranking of the documents over time.

11 Claims, 5 Drawing Sheets

U.S. PATENT DOCUMENTS

| | | | |
|---|---|---|---|
| 2006/0248059 A1 | 11/2006 | Chi et al. | |
| 2006/0248073 A1 | 11/2006 | Jones et al. | |
| 2006/0277175 A1 | 12/2006 | Jiang et al. | |
| 2006/0294124 A1* | 12/2006 | Cho | 707/101 |
| 2007/1004370 | 2/2007 | Raub et al. | |
| 2007/0094255 A1* | 4/2007 | Acharya et al. | 707/5 |
| 2007/0250468 A1* | 10/2007 | Pieper | 707/1 |

OTHER PUBLICATIONS

Fogaras, et al. "Towards Scaling Fully Personalized PageRank: Algorithims, Lower Bounds, and Experiments", *Internet Mathematics*, vol. 2, No. 3. 2005, pp. 333-358.

Gyongyi, et al. "Combating Web Spam with TrustRank", *Proceedings of the Thirtieth International* Conference on Very Large Data Bases, 2004.

Gyongyi, et al. "Link Spam Alliances", *Technical Report*, Stanford University, 2005.

Gyongyi, et al. "Link Spam Detection Based on Mass Estimation", *VLDB '06*. Sep. 12-15, 2006, Seol, Korea. Copyright 2006 VLDB Endowment, ACM.

Gyongyi, et al. "Web Spam Taxonomy", *First International Workshop on Adversarial Information Retrieval on the Web*, 2005.

Haveliwala, et al. "An Analytical Comparison of Approaches to Personalizing PageRank", *Technical Report*, Stanford University, 2003.

Haveliwala. "Topic-Sensitive PageRank", *Proceedings of the International World Wide Web Conference*, 2002.

Jeh, et al. "Scaling Personalized Web Search", *WWW '03: Proceedings of the 12th International Conference on World Wide Web*, pp. 271-279, New York, NY, USA, 2003. ACM Press.

Nie, et al. "Topical Link Analysis for Web Searches", *Proceedings of the 29th Annual International ACM SIG1R Conference on Research and Development in Information Retrieval*, 2006.

Page, et al. "The PageRank Citation Ranking: Bringing Order to the Web", *Technical Report*, Stanford University, Stanford, CA, 1998.

Yu, et al. "Adding the Temporal Dimension to Search—A Case Study in Publication Search", *The 2005 IEEE/WIC/ACM International Conference on Web Intelligence*, Sep. 19-22, 2005 (1 page).

International Search Report for PCT/US2008/067325, dated Nov. 27, 2008, 3 pages.

Page et al., "The PageRank Citation Ranking: Bringing Order to the Web," Stanford University, Abstract, Jan. 29, 1998, 17 pages.

Supplementary European Search Report, EP No. 08771348, Sep. 1, 2011, 5 pages.

\* cited by examiner

RANKING DOCUMENTS BASED ON A SERIES OF DOCUMENT GRAPHS

BACKGROUND

Many search engine services, such as Google and Yahoo, provide for searching for information that is accessible via the Internet. These search engine services allow users to search for display pages, such as web pages, that may be of interest to users. After a user submits a search request (i.e., a query) that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service identifies web pages that may be related to the search request based on how well the keywords of a web page match the words of the query. The search engine service then displays to the user links to the identified web pages in an order that is based on a ranking that may be determined by their relevance to the query, popularity, importance, and/or some other measure.

One well-known technique for page ranking is PageRank, which is based on the principle that web pages will have links to (i.e., "out links") important web pages. The importance of a web page is based on the number and importance of other web pages that link to that web page (i.e., "in links"). PageRank is based on a random surfer model of visiting web pages of a web graph (vertices representing web pages and links representing hyperlinks) and represents the importance of a web page as the stationary probability of visiting that web page. In the random surfer model, a surfer visiting a current page will visit a next page by randomly selecting a link of the current web page or by randomly jumping to any web page. If the current web page has three out links to target web pages, then the transition probability of visiting each target web page from the current web page is ⅓ using a link of the current web page. The probability of jumping to any web page is typically set to equal the probability of jumping to any other web page. So, if there are n web pages, then the jumping probability is set to 1/n for each web page, referred to as a jumping vector. PageRank is thus based on a Markov random walk that only depends on the information (e.g., hyperlinks) of the current web page and the jumping probabilities.

A web graph may be represented as $G=<V, E>$, where $V=\{1, 2, \ldots, n\}$ is the set of vertices and $E=\{<i, j>|i, j \in V\}$ is the set of edges. The links between web pages can be represented by an adjacency matrix A, where $A_{ij}$ is set to one when there is an out link from a source web page i to a target web page j. The importance score $w_j$ for web page j can be represented by the following:

$$w_j = \Sigma_i A_{ij} w_i \qquad (1)$$

This equation can be solved by iterative calculations based on the following:

$$A^T w = w \qquad (2)$$

where w is the vector of importance scores for the web pages and is the principal eigenvector of $A^T$.

As discussed above, a page ranking algorithm may also factor in that a surfer may randomly select a web page to visit next that is not linked to by the current web page. Thus, the surfer may next visit a target web page of the current web page with a probability of α and next visit a randomly selected web page with a probability of 1−α. To factor in this random selection of web pages, the page ranking algorithm generates an initial transition probability matrix P by normalizing each non-zero row of the adjacency matrix with the sum of its elements. The page ranking algorithm then sets each element of a zero row in matrix P to 1/n to generate transition probability matrix $\bar{P}$. The model of representing the random selection of links of target web pages and the random selection of web pages can be represented by the following:

$$\bar{P} = \alpha \bar{P} + (1-\alpha) U \qquad (3)$$

where $\bar{P}$ is the combined transition probability matrix and U is a uniform probability distribution matrix in which each element is set to 1/n. The uniform probability distribution matrix U may be generated by multiplying the jumping vector by the unit vector as represented by the following:

$$\tilde{P} = \alpha P + (1-\alpha) e^t v$$

where e represents the unit vector and v represents the jumping vector. The page ranking algorithm considers the stationary probability distribution $\pi = (\pi_1, \pi_2, \ldots, \pi_n)^T$ of the transition probability matrix $\bar{P}$ to represent the importance of each web page. The page ranking algorithm may compute the stationary distribution through an iterative process as represented by the following:

$$\pi(t+1) = (\bar{P})^T \pi(t) \qquad (4)$$

where $\pi(0) = (1, 1, \ldots, 1)_n^T$, t represents the iteration count, and the iterative process continues until π converges on a solution. The stationary probability distribution is represented by the principal eigenvector, which may calculated using a standard power iteration technique.

Although a page ranking algorithm can be very useful, in part because it is a query-independent measure of importance, it is especially susceptible to "link spamming." "Spamming" in general refers to a deliberate action taken to unjustifiably increase the rank, relevance, popularity, importance, and so on of a web page or a web site. In the case of link spamming, a spammer can manipulate links to unjustifiably increase the importance of a web page. For example, a spammer may provide a web page of useful information with hidden links to spam web pages. When many web pages point to the useful information, the importance of the spam web pages is indirectly increased. As another example, many web sites, such as blogging sites and web directories, allow visitors to post links. Spammers can post links to their spam web pages to directly or indirectly increase the importance of the spam web pages. As another example, a group of spammers may set up a link exchange mechanism in which their web sites point to each other to increase the importance of the web pages of the spammers' web sites.

Web spam presents problems for various techniques that rely on web data. For example, a search engine service that orders search results in part based on relevance, popularity, or importance of web pages may rank spam web pages unjustifiably high because of the spamming. Users of such search engine services may be dissatisfied when spam pages are ranked unjustifiably high and may stop using that search engine service. As another example, a web crawler may spend valuable time crawling the links of spam web sites, which increases the overall cost of web crawling and may reduce its effectiveness.

SUMMARY

Ranking documents based on a series of document graphs collected over time is provided. A ranking system ranks documents based on a document graph by factoring in the ranking of the documents based on previous document graphs. The ranking system may provide multiple transition probability distributions indicating a probability of transitioning from one document to another document within a collection of documents using a link of the document. Each transition probability distribution represents the probabilities based on different documents that may be in the collection and different links between the documents. The ranking system determines an initial stationary probability distribution for a first transition probability distribution to represent a ranking of the documents. The ranking system then determines a next stationary probability distribution based on a next transition probability distribution and the initial stationary probability distribution. The ranking system may then rank documents, at least in part, based on the next stationary probability distribution. The ranking of the documents can then be used when ranking documents of search results or in any other application in which the ranking (or importance) of documents is needed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Ranking documents based on a series of document graphs collected as different snapshots over time is provided. A ranking system ranks documents based on a document graph factoring in the ranking of the documents derived from previous document graphs. In some embodiments, a ranking system provides multiple transition probability distributions indicating a probability of transitioning from one document to another document within a collection of documents using a link of the document. Each transition probability distribution represents the probabilities based on different documents that may be in the collection and different links between the documents. For example, when the documents are web pages, the ranking system derives the transition probability distributions from web graphs collected at various times. The ranking system determines an initial stationary probability distribution for a first transition probability distribution to represent a ranking of the documents. For example, the ranking system may use a standard power iteration technique to identify the principal eigenvector of the first transition probability distribution to represent the ranking of the documents. The ranking system then determines a next stationary probability distribution based on a next transition probability distribution and the initial stationary probability distribution. For example, to determine the next stationary probability distribution, the ranking system may use the initial stationary probability distribution as the jumping vector for determining the next stationary probability distribution. The ranking system may then rank documents, at least in part, based on the next stationary probability distribution. Because the determination of the next stationary probability distribution is based on the initial stationary probability distribution, the ranking system factors in the initial ranking of documents in the next ranking of documents. Thus, a document that is ranked highly by the initial stationary probability distribution will have a tendency to be ranked higher by the next stationary probability distribution. Similarly, a document that is not ranked highly by the initial stationary probability distribution will have a tendency to be ranked lower by the next stationary probability distribution. When the documents are web pages, the effect of link spamming newly introduced between the crawling of the web for the initial web graph and the next web graph will be somewhat attenuated because web pages ranked highly by the initial stationary probability distribution will tend to remain highly ranked.

Figure 1:
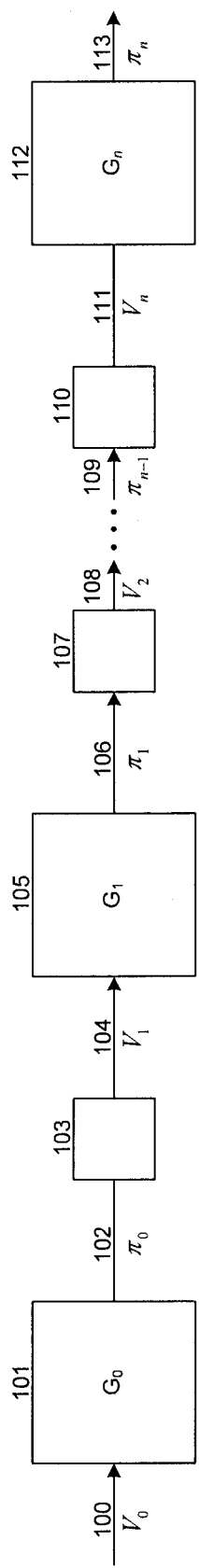
FIG. 1 is a block diagram that illustrates the calculating of the importance of web pages over time by the ranking system in some embodiments.

FIG. 1 is a block diagram that illustrates the calculating of the importance of web pages over time by the ranking system in some embodiments. The ranking system starts out with an initial jumping vector $v_0$ 100 and an initial web graph $G_0$ 101 that is an initial snapshot of the web. The ranking system then determines the initial ranking of the web pages $\pi_0$ 102. The ranking system then may modify 103 (as described below) the ranking $\pi_0$ to give the jumping vector $v_1$ 104. The ranking system determines the second ranking of the web pages $\pi_1$ 106 using the jumping vector $v_1$ and the second web graph $G_1$ 105 that is a second snapshot of the web. The ranking system then may modify 107 the ranking $\pi_1$ to give the jumping vector $v_2$ 108. The ranking system repeats this process for all web graphs. For the final web graph $G_n$ 112, the ranking system modifies 110 the ranking $\pi_{n-1}$ 109 to give the jumping vector $v_n$ 111. The ranking system determines the final ranking of the web pages $\pi_n$ 113 using the jumping vector $v_n$ and the final web graph $G_n$.

The ranking system may modify the jumping vectors to personalize them to the user, to account for spam web pages, to account for changes in the web graphs, and so on. The ranking system may personalize the initial jumping vector $v_0$ to each user. For example, the ranking system may analyze a user's history to identify the frequency with which the user visits web pages. The initial jumping vector may be based on this history (e.g., clickthrough data) so that the probability of visiting a web page without using a link may be based on the frequency with which a user visits a web page, rather than with equal probability. As the ranking system re-ranks web pages using different web graphs, the initial personalization will influence the subsequent rankings. The ranking system may also personalize jumping vectors other than the initial jumping vectors. The ranking system may modify the ranking of the previous web graph to factor in the personalization. Whenever the ranking system personalizes or otherwise modifies a jumping vector, it may need to normalize the jumping vector to ensure that it represents a probability distribution.

The ranking system may also set an initial jumping vector $v_0$ that factors in known spam web pages. For example, the ranking system may set the probability of visiting a spam web page without using a link to zero so that the stationary probability of visiting, and thus the ranking of, the spam web page will be lower. In general, the ranking system may lower the probability of suspected spam web pages based on the confidence that the ranking system has that the web pages are actually spam. For example, the ranking system may only slightly lower the probability for a web page that is identified as spam with a confidence of only 10% and may significantly lower the probability for a web page that is identified as spam with a confidence of 90%. The ranking system may adjust any subsequent jumping vectors to factor in additional spam information. In addition, the ranking system may use jumping vectors that both are personalized to a user and factor in known spam web pages.

The ranking system may adjust the jumping vectors to factor in new and removed web pages. Each time the web is crawled, new web pages may be encountered (e.g., a web site has added a new web page) and web pages previously encountered might not be encountered again (e.g., a web site has removed a web page). To account for new and removed web pages, the ranking system may add elements to and remove elements from the jumping vectors and set their initial probabilities. The ranking system then normalizes the jumping vectors so that they represent a probability distribution.

Figure 2:
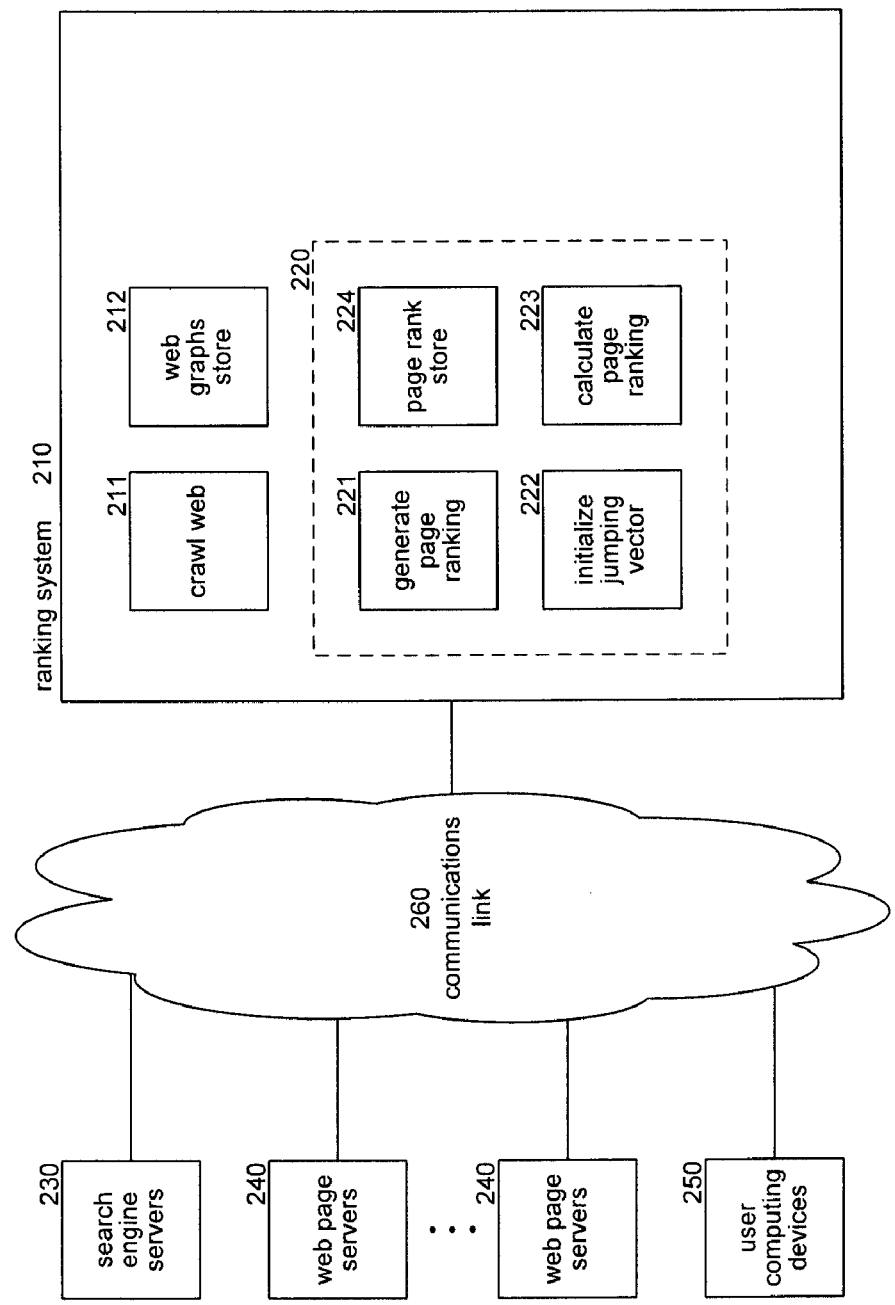
FIG. 2 is a block diagram that illustrates components of the ranking system in some embodiments.

FIG. 2 is a block diagram that illustrates components of the ranking system in some embodiments. The ranking system 210 may be connected to search engine servers 230, web page servers 240, and end user computing devices 250 via communications link 260. The search engine servers may provide conventional search engine services modified to rank search results based on the ranking of web pages provided by the ranking system. The ranking system may provide a ranking of web pages to the search engine servers for the ranking of the search results. The ranking system may also input from the web page servers or search engine servers clickthrough data for users that is used in personalizing the jumping vectors. The ranking system may also input from a spam detection system indications (not shown) of web pages that are suspected of being spam.

The ranking system may include a crawl web component 211 and a web graphs store 212. The crawl web component may periodically crawl the web and generate a web graph represented by an adjacency matrix that is stored in the web graphs store. For example, the crawl web component may crawl the web on a weekly or monthly basis. The ranking system may normalize the adjacency matrix for each web graph to generate a transition probability distribution matrix for each web graph. The web graphs may represent only portions of the web that relate to certain topics. For example, the crawl web component may focus on web pages that are related in some way to historical topics to support a search engine service that focuses on historical topics.

The ranking system also include a ranking subsystem 220 that includes a generate page ranking component 221, an initialize jumping vector component 222, a calculate page ranking component 223, and a page rank store 224. The generate page ranking component invokes the initialize jumping vector component to generate the initial jumping vector. The generate page ranking component then selects each web graph starting with an initial web graph and invokes the calculate page ranking component passing the transition probability distribution of the selected web graph and the stationary probability distribution generated from the previously selected web graph as a jumping vector. The calculated page ranking is then stored in the page rank store for use in calculating the page rank for the next web graph.

The computing device on which the ranking system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the ranking system, which means a computer-readable medium that contains the instructions. In addition, the instructions, data structures, and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in and used by various operating environments that include personal computers, server computers, hand-held or laptop devices, multiprocessor systems, microprocessor-based systems, programmable consumer electronics, digital cameras, network PCs, minicomputers, mainframe computers, computing environments that include any of the above systems or devices, and so on.

The ranking system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, a computing system separate from the one that implements the ranking system may crawl the web and generate the adjacency matrices and transition probability distribution matrices for the web graph. As another example, the ranking system may be hosted on the same computing system as a search engine service or a link spam detection system. Also, the search engine may be hosted on a separate computing system.

Figure 3:
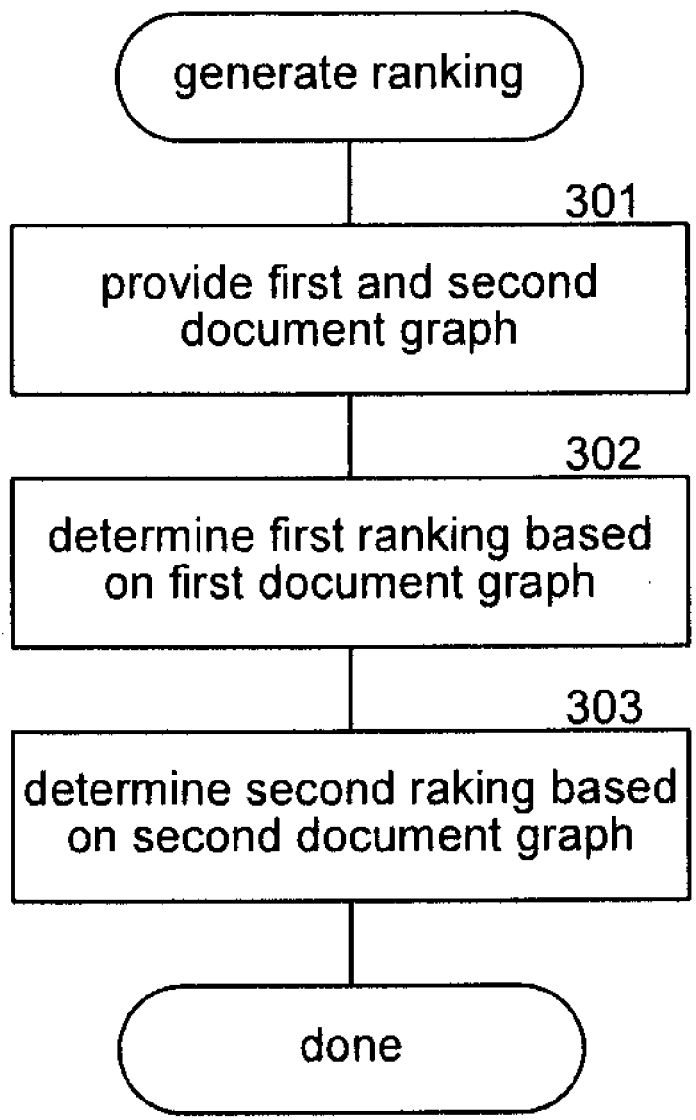
FIG. 3 is a flow diagram that illustrates the processing of a component for generating the ranking of documents in some embodiments.

FIG. 3 is a flow diagram that illustrates the processing of a component for generating the ranking of documents in some embodiments. In block 301, the component provides a first and a second document graph (e.g., web graphs representing different snapshots of the web). In block 302, the component determines a first ranking of the documents using the first document graph. The determination of the first ranking may factor in an initial ranking (e.g., jumping vector) of the documents. In block 303, the component determines the second ranking of the documents using the second document graph and the first ranking of the document generated in block 302. The component then completes with the second ranking representing the importance or static ranking of the documents.

Figure 4:
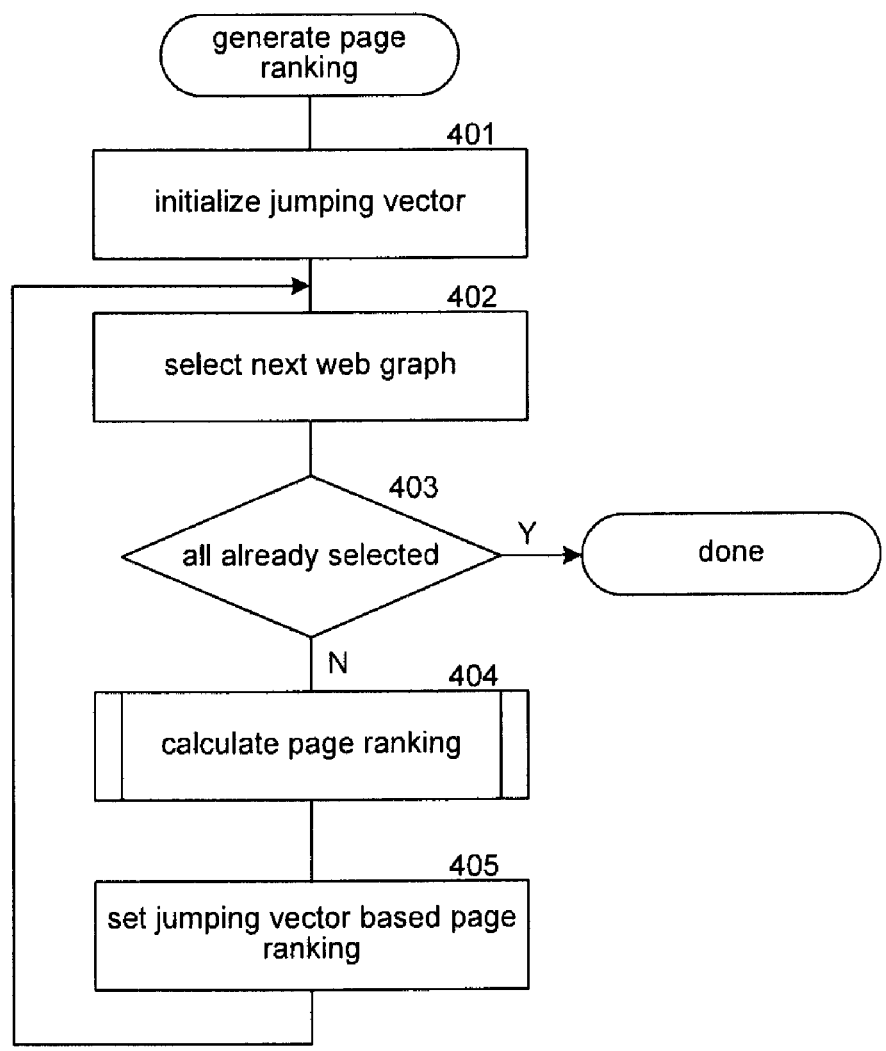
FIG. 4 is a flow diagram that illustrates the processing of the generate page ranking component of the ranking system in some embodiments.

FIG. 4 is a flow diagram that illustrates the processing of the generate page ranking component of the ranking system in some embodiments. The component loops selecting each web graph and determining its stationary probability distribution using the transition probability distribution of the web graphs and a jumping vector derived from a stationary probability distribution of the previous web graph. In block 401, the component initializes the initial jumping vector. In block 402, the component selects the next web graph. In decision block 403, if all the web graphs have already been selected, then the component completes, else the component continues at block 404. In block 404, the component invokes the calculate page ranking component to calculate the page ranking or stationary probability distribution for the selected web graph using a jumping vector derived from the page ranking of the previous web graph. In block 405, the component sets the jumping vector for the next web graph based on the current page ranking. The component then loops to block 402 to select the next web graph. The component in block 405 may set the jumping vector to factor in a user's browse history, suspected spam web pages, new and removed web pages, and so on.

Figure 5:
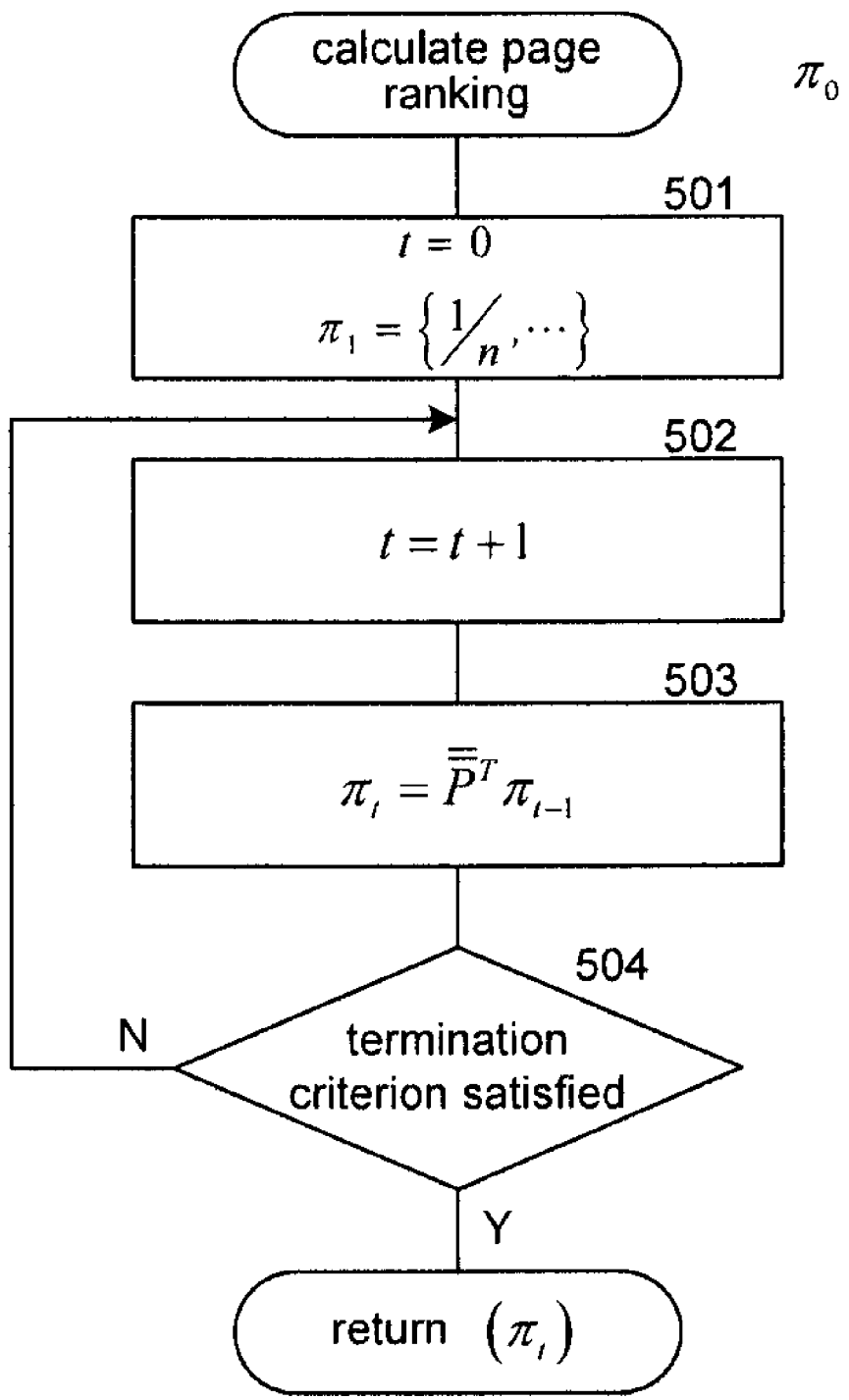
FIG. 5 is a flow diagram that illustrates the processing of the calculate page ranking component of the ranking system in some embodiments.

FIG. 5 is a flow diagram that illustrates the processing of the calculate page ranking component of the ranking system in some embodiments. One skilled in the art will appreciate that since the stationary probability distribution can be represented by a principal eigenvector, any of various well-known techniques for identifying the principal eigenvector can be used. In this embodiment, the component calculates the stationary probability distribution using a standard power iterative technique. In block 501, the component initializes a variable to index the stationary probability distribution at each iteration and initializes the initial stationary probability distribution. In block 502, the component increments to the next iteration. In block 503, the component multiplies the probability distribution matrix (i.e., that factors in both the transition probability distribution and the probability distribution derived from the jumping vector) for the web graph by the stationary probability distribution calculated during the last iteration. In decision block 504, if a termination criterion is satisfied, then the component returns the stationary probability distribution as a ranking of the web pages, else the component loops to block 502 to start the next iteration. The termination criterion may be based on a certain number of iterations, convergence of the stationary probability distribution to a solution (e.g., the difference between the stationary probability distribution of two successive iterations is less than a convergence threshold), and so on.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. One skilled in the art will appreciate that a document can include any information content that contains links or otherwise identifies other content. For example, a document may be a web page with links to other web pages, a scholarly article with citations to other scholarly articles, a judicial opinion with citations to other judicial opinions, a patent with citations to other patents, and so on. The ranking of documents can be used in many applications, such as to direct web crawling based on importance of web pages, to rank web sites based on ranking of web pages, to recommend web pages and web sites, and so on. Accordingly, the invention is not limited except as by the appended claims.

We claim:

1. A method in a computing device that is programmed for ranking documents with links between the documents, the method comprising:
   providing a first document graph representing links between the documents at a first time and a second document graph representing links between the documents at a second time that is later than the first time;
   determining by the computing device a first ranking of the documents based on the first document graph by:
      initializing a first jumping vector indicating probabilities of visiting the documents without using a link, the initializing including setting the probability of visiting a suspected spam document without using a link to zero; and
      generating a first transition probability matrix indicating probabilities of visiting the documents using links; and
      applying a page ranking algorithm to the first document graph to generate a first ranking of the documents based on the first transition probability matrix and the first jumping vector wherein the ranking of the suspected spam document is lowered as a result of setting the probability of visiting the suspect spam document without using a link to zero; and
   determining by the computing device a second ranking of the documents based on the second document graph and the first ranking of the documents based on the first document graph by:
      initializing a second jumping vector indicating probabilities of visiting the documents without using a link, the second jumping vector being initialized based on the first ranking of documents such that a higher first ranking increases the probability of visiting a document without a link; and
      generating a second transition probability matrix indicating probabilities of visiting the documents using links; and
      applying a page ranking algorithm to the second document graph to generate a second ranking of the documents based on the second transition probability matrix and the second jumping vector.

2. The method of claim 1 wherein:
   the providing includes providing a first and a second transition probability distribution indicating probability of transitioning from one document to another document using a link;
   the determining of the first ranking includes determining a first stationary probability distribution based on the first transition probability distribution indicating a stationary probability of transitioning to each document; and
   the determining of the second ranking includes determining a second stationary probability distribution based on the second transition probability distribution and the first stationary probability distribution wherein the second stationary probability distribution represents the second ranking of the documents.

3. The method of claim 2 wherein the determining of the second stationary probability distribution uses the first stationary probability distribution as an indication of the probability of transitioning to each document without using a link.

4. The method of claim 2 wherein the first transition probability distribution is based, at least in part, on a user's history of visiting documents.

5. The method of claim 2 wherein the documents are web pages and the first and second transition probability distribution is generated based on the links between the web pages.

6. A computer-readable storage medium containing instructions for controlling a computing device to rank web pages, by a method comprising:
   providing a first web graph representing links between the web pages at a first time and a second web graph representing links between the web pages at a second time that is later than the first time;
   determining a first ranking of the web pages based on the first web graph by:
      initializing a first jumping vector to indicate probabilities of visiting the web pages without using a link, the initializing including setting the probability of visiting a suspected spam web page without using a link based on confidence that the suspected spam web page is actually spam so that the set probability decreases as the confidence increases; and generating a first transition probability matrix indicating probabilities of visiting the web pages using links; and applying a page ranking algorithm to the first web graph to generate a first ranking of the web pages based on the first transition probability matrix and the first jumping vector wherein the ranking of a suspected spam web page is lowered as a result of setting the probability of visiting the suspect spam web page without using a link based on confidence that the suspected web page is actually spam; and determining by the computing device a second ranking of the web pages based on the second web graph and the first ranking of the web pages based on the first web graph by:

initializing a second jumping vector indicating probabilities of visiting the web pages without using a link, the second jumping vector being initialized based on the first ranking of web pages such that a higher first ranking increases the probability of visiting a web page without a link; and generating a second transition probability matrix indicating probabilities of visiting the web pages using links; and applying a page ranking algorithm to the second web graph to generate a second ranking of the web pages based on the second transition probability matrix and the second jumping vector.

7. The computer-readable storage medium of claim 6 wherein:

the providing includes providing a first and a second transition probability distribution indicating probability of transitioning from one web page to another web page using a link;

the determining of the first ranking includes determining a first stationary probability distribution based on the first transition probability distribution indicating a stationary probability of transitioning to each web page; and the determining of the second ranking includes determining a second stationary probability distribution based on the second transition probability distribution and the first stationary probability distribution wherein the second stationary probability distribution represents the second ranking of the web pages.

8. The computer-readable storage medium of claim 7 wherein the first transition probability distribution is based, at least in part, on a user's history of visiting web pages.

9. A computing device for ranking web pages, the computing device comprising:

a memory storing computer-executable instructions of:

a component that provides access to a first web graph representing links between the web pages at a first time and a second web graph representing links between the web pages at a second time that is later than the first time;

a component that determines a first ranking of the web pages based on the first web graph by:

initializing a first jumping vector to probabilities of visiting the web pages without using a link, the initializing including setting the probability of visiting a suspected spam web page without using a link based on confidence that the suspected spam web page is actually spam so that the set probability decreases as the confidence increases; and generating a first transition probability matrix indicating probabilities of visiting the web pages using links; and applying a page ranking algorithm to the first web graph to generate a first ranking of the web pages based on the first transition probability matrix and the first jumping vector wherein the ranking of a suspected spam web page is lowered as a result of setting the probability of visiting the suspect spam web page without using a link based on confidence that the suspected web page is actually spam; and a component that determines a second ranking of the web pages based on the second web graph and the first ranking of the web pages based on the first web graph by:

initializing a second jumping vector indicating probabilities of visiting the web pages without using a link, the second jumping vector being initialized based on the first ranking of web pages such that a higher first ranking increases the probability of visiting a web page without a link; and generating a second transition probability matrix indicating probabilities of visiting the web pages using links; and applying a page ranking algorithm to the second web graph to generate a second ranking of the web pages based on the second transition probability matrix and the second jumping vector; and a processor that executes the computer-executable instructions stored in the memory.

10. The computing device of claim 9 including:

a component that provides access to a first and a second transition probability distribution indicating probability of transitioning from one web page to another web page using a link; and wherein the component that determines the first ranking determines a first stationary probability distribution based on the first transition probability distribution indicating a stationary probability of transitioning to each web page; and the component that determines the second ranking determines a second stationary probability distribution based on the second transition probability distribution and the first stationary probability distribution wherein the second stationary probability distribution represents the second ranking of the web pages.

11. The computing device of claim 10 wherein the first transition probability distribution is based, at least in part, on a user's history of visiting documents.

* * * * *